United States Patent [19]
Gray et al.

[11] Patent Number: 5,528,890
[45] Date of Patent: Jun. 25, 1996

US005528890A

[54] SPRIG HARVESTER WITH PIVOTING ELEVATOR

[75] Inventors: Jimmy D. Gray, Kingfisher; Louis F. Klingsick, Jr., El Reno, both of Okla.

[73] Assignee: Bermuda King, L.L.C., Okarche, Okla.

[21] Appl. No.: 323,399

[22] Filed: Oct. 14, 1994

[51] Int. Cl.⁶ .......................... A01D 17/00; A01D 61/00
[52] U.S. Cl. ...................... 56/16.6; 56/185; 171/130
[58] Field of Search .................... 56/16.6, 185, 228, 56/327.1, DIG. 13; 171/126, 130, 138; 460/114, 119

[56]  References Cited

U.S. PATENT DOCUMENTS

| | | | |
|---|---|---|---|
| 1,593,952 | 7/1926 | Ribbans | 171/138 X |
| 3,579,968 | 5/1971 | Hill et al. | 56/327.1 X |
| 4,047,573 | 9/1977 | Aoyama | 56/327.1 X |

OTHER PUBLICATIONS

Flyer on Bermuda King Sprig Harvester (Undated but admitted to be prior art).

*Primary Examiner*—David J. Bagnell
*Attorney, Agent, or Firm*—Dougherty, Hessin, Beavers & Gilbert

[57]  ABSTRACT

A sprig harvester apparatus for harvesting sprigs of grass, such as Bermuda grass, from a ground surface and conveying the grass sprigs to an awaiting receptacle. The apparatus includes a harvesting portion mounted on a rolling chassis. The harvesting portion includes blades for cutting the grass sprigs from the ground surface and a first elevator chain for moving the grass sprigs upwardly, while providing sufficient vibration to shake soil therefrom. The grass sprigs are discharged from the harvesting portion into a hopper section of a hopper/elevator portion. The hopper/elevator portion is mounted on a pivot assembly attached to the chassis. The hopper/elevator portion also includes an upper elevator section pivotally connected to the hopper section so that it can be raised and lowered by a hydraulic cylinder. A second elevator chain, disposed in the hopper and upper elevator section, conveys the grass sprigs upwardly so that they may be discharged to fall into an awaiting receptacle, such as a vehicle alongside the apparatus. The pivot assembly allows the hopper/elevator portion to be pivoted between a longitudinal traveling position and a transverse operating position.

18 Claims, 4 Drawing Sheets

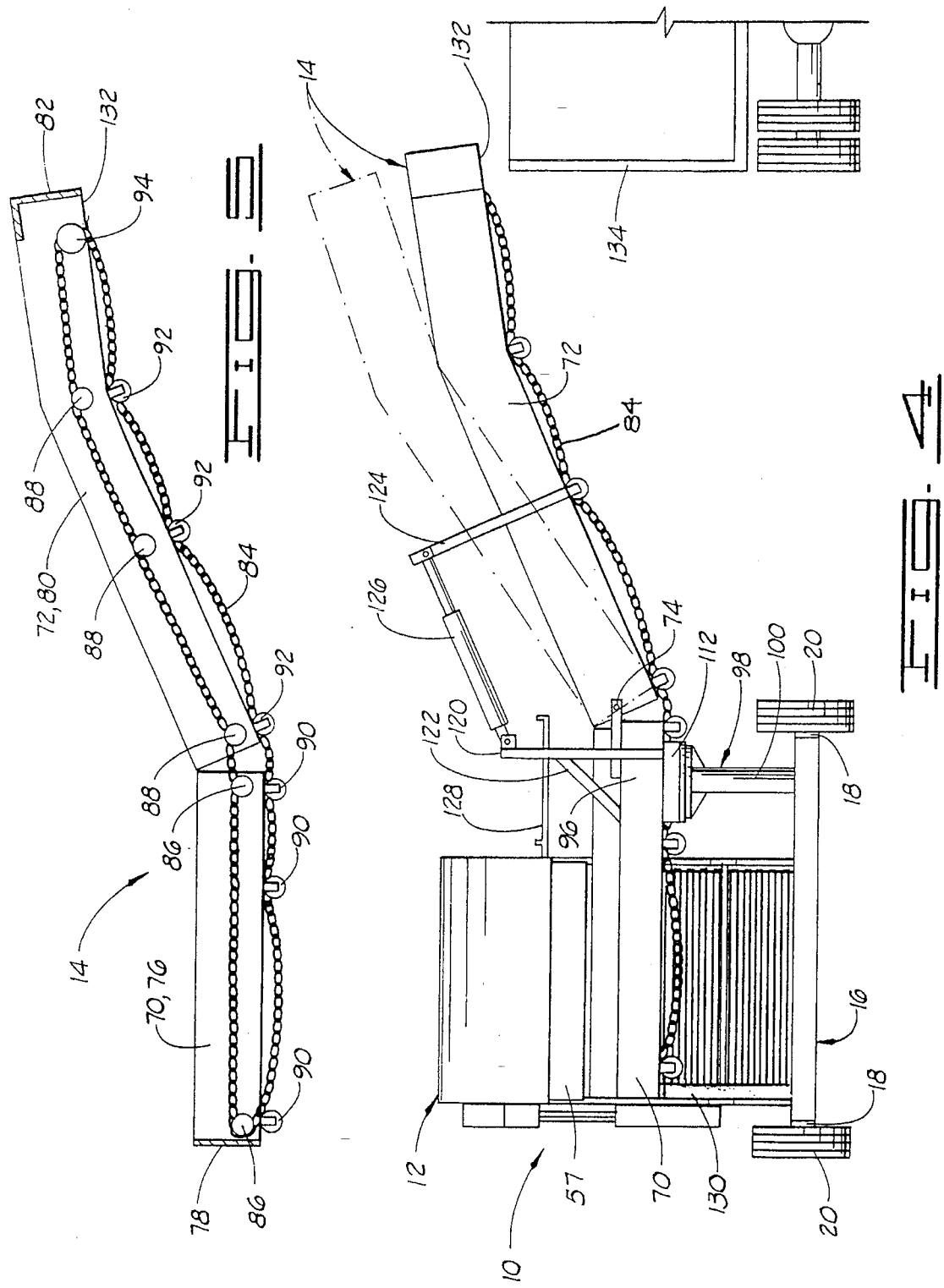

SPRIG HARVESTER WITH PIVOTING ELEVATOR

BACKGROUND OF THE INVENTION

1. Field of the Invention

This invention relates to sprig harvesters used in harvesting grass sprigs for grasses such as Bermuda grass, and more particularly, to a sprig harvester having a hopper and an upper elevator which may be pivoted between traveling and operating positions.

2. Description of the Prior Art

With grasses such as Bermuda grass, sprig harvesters are used to remove growing grass from a plot of land, separate the grass from the soil, and convey the grass sprigs to a transport vehicle. One such device is the Bermuda King® Sprig Harvester. This apparatus is manufactured in the form of a trailer which may be pulled behind a suitable vehicle, such as a tractor.

The Bermuda King® Sprig Harvester includes a harvesting or first elevator portion having a forward end with rotary cutting blades which cut into the soil and lift the cut grass sprigs and soil, still partially affixed to the grass, and allow the sprigs and soil to fall onto a large, first elevator chain. This first elevator chain moves in a longitudinal direction to convey the sprigs and soil upwardly and rearwardly with respect to the apparatus. The movement of the chain provides enough vibration so that the soil is substantially broken away from the grass sprigs themselves, and virtually only the grass sprigs reach the top of the first elevator chain.

A second, upper elevator extends transversely to the first elevator, and the grass sprigs falling from the top of the first elevator chain fall onto a lower portion of a second elevator chain in the second elevator. The second elevator carries the grass sprigs transversely and upwardly where they are discharged into a suitable receptacle, typically a transport vehicle such as a truck, alongside the sprig harvester. The transverse elevator is raised manually to its operating position and supported by chains.

The second, transverse elevator must be manually lowered and disconnected from the main apparatus so that it can be mounted in a longitudinally disposed traveling position alongside the main elevator when the apparatus is being pulled down the road. That is, the second elevator cannot remain in its operating transverse position when traveling.

Functionally, the prior art sprig harvester works well, but the process of disconnecting the transverse elevator and stowing it for traveling and then repositioning it when operation is again desired, is time-consuming. The apparatus of the present invention solves this problem by providing a transverse elevator and hopper system which is pivotally connected to the main apparatus. It is a simple matter to rotate it between the traveling and operating positions. A hydraulic cylinder system is used to raise and lower it.

SUMMARY OF THE INVENTION

The sprig harvester apparatus of the present invention is adapted for removing sprigs of grass, such as Bermuda grass, from a ground surface and conveying the grass sprigs to a suitable receptacle, such as a transport vehicle positioned alongside the sprig harvester. The sprig harvester comprises a harvesting portion comprising means for removing the grass sprigs from the ground surface, an elevator portion adjacent to the harvesting portion and adapted for receiving the grass sprigs discharged from the harvesting portion, and means for pivoting the elevator portion with respect to the harvesting portion. Using this means for pivoting, the elevator portion may be pivoted between a substantially longitudinal traveling position substantially parallel to the harvesting portion and a substantially transverse operating position substantially perpendicular to the harvesting portion.

The elevator portion may also be referred to as a hopper/elevator portion comprising a hopper section attached to the means for pivoting and an upper elevator section pivotally connected to the hopper section. The apparatus may further comprise a hydraulic cylinder interconnecting the hopper section and the upper elevator section such that the hopper section may be raised and lowered with respect to the hopper section. In the preferred embodiment, retracting the hydraulic cylinder raises the elevator section, and extending the hydraulic cylinder lowers the elevator section. The elevator section is pivotable with respect to the hopper section about a substantially horizontal axis.

The means for pivoting may be characterized by a pivot assembly comprising a stationary lower pivot plate, an upper pivot plate disposed on the lower pivot plate and rotatable with respect thereto, and a pivot frame attached to the elevator portion and the upper pivot plate. The means for pivoting preferably has a substantially vertical axis.

In the preferred embodiment, the sprig harvester apparatus further comprises a rolling chassis with wheels attached thereto and adapted for connection to a suitable vehicle, such as a tractor, for pulling the apparatus. The harvesting portion and the means for pivoting are attached to the chassis.

The harvesting portion is of a kind generally known in the art and comprises a plurality of rotatable harvesting blades adapted for engaging the ground surface and removing the grass sprigs therefrom, a movable elevator chain having a portion adjacent to the harvesting blades and adapted for receiving the grass sprigs from the blades, and an upper shroud disposed adjacent to an upper end of the elevator chain through which the grass sprigs are discharged from the harvesting portion.

The hopper/elevator portion also preferably comprises a movable second elevator chain disposed in the hopper and upper elevator sections for receiving the grass sprigs discharged from the harvesting portion and conveying the grass sprigs to the upper end of the upper elevator section, at which point they are discharged to fall into the awaiting receptacle.

The means for pivoting allows the apparatus to be quickly and easily configured between the traveling and operating positions, thereby providing a great savings in time over prior art spring harvesters.

Numerous objects and advantages of the invention will become apparent as the following detailed description of the preferred embodiment is read in conjunction with the drawings which illustrate such embodiment.

BRIEF DESCRIPTION OF THE DRAWINGS

FIG. 4 is a rear elevational view of the sprig harvester shown in the operating position.

FIG. 5 is a cross section of the hopper and upper elevator portions only taken along lines 5—5 in FIG. 3.

DESCRIPTION OF THE PREFERRED EMBODIMENT

Figure 1:
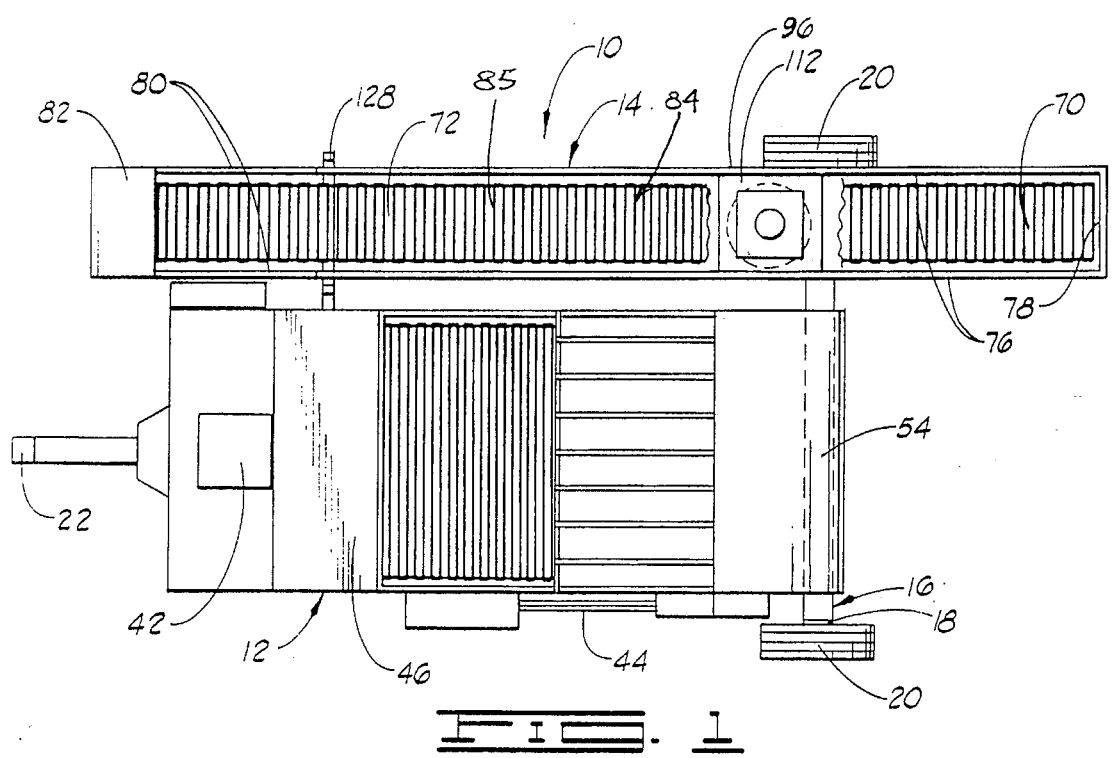
FIG. 1 is a plan view of the sprig harvester apparatus of the present invention shown in a traveling position.

Referring now to the drawings, the sprig harvesting apparatus of the present invention is shown and generally designated by the numeral 10.

Figure 2:
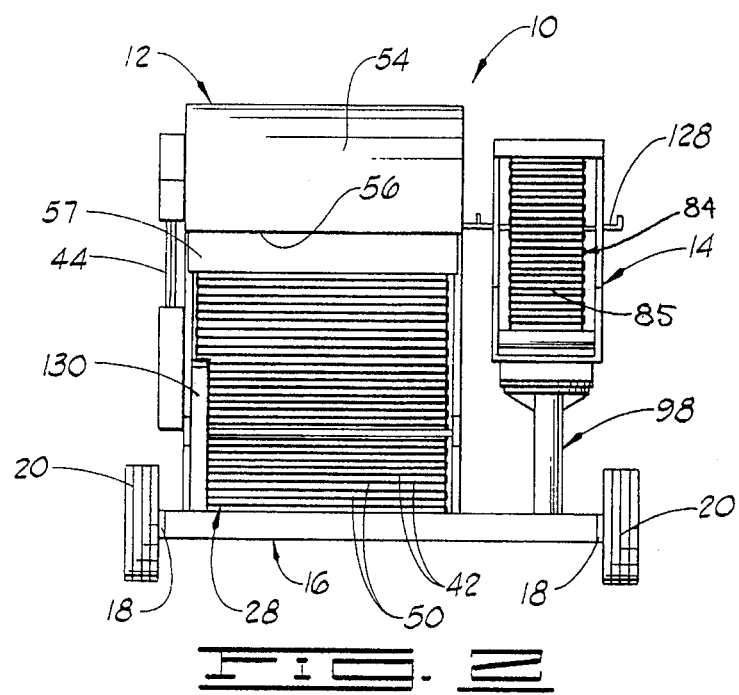
FIG. 2 shows a rear elevation of the sprig harvester in the traveling position.

Referring initially to FIGS. 1 and 2, sprig harvester 10 is illustrated in a traveling position, as will be further described herein. Apparatus 10 may be said to generally comprise a harvesting portion 12, a pivotally disposed hopper/elevator portion 14 and a chassis 16. Harvesting portion 12 and hopper/elevator portion 14 are mounted on chassis 16.

Chassis 16 includes axles 18 on which are mounted wheels 20. A trailer hitch 22 of a kind known in the art extends forwardly from apparatus 10, and it will be seen by those skilled in the art that the apparatus thus may be pulled behind any suitable vehicle.

Figure 6:
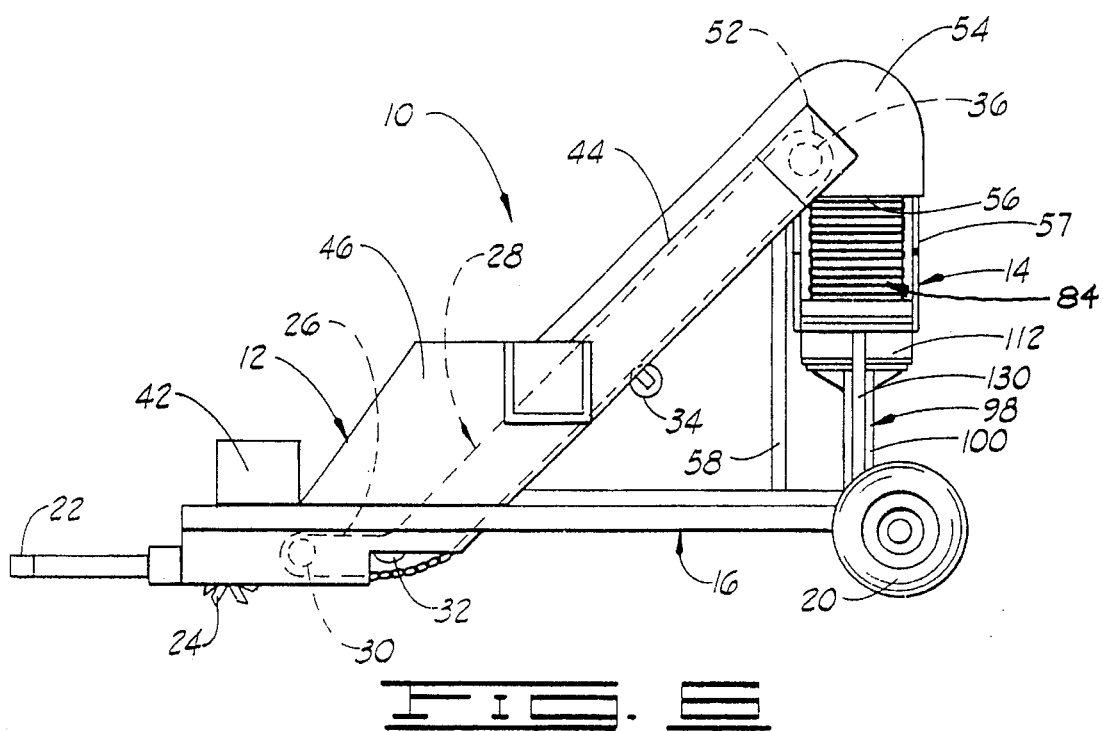
FIG. 6 shows a side elevation of the apparatus in the operating position as seen from the bottom of FIG. 3.

Referring now to FIGS. 1, 2 and 6, harvesting portion 12 of apparatus 10 will be discussed. Harvesting portion 12 is substantially the same as the corresponding portion of prior art Bermuda King® Sprig Harvester. Thus, harvesting portion 12 is of a kind known in the art, but will be discussed herein in sufficient detail for a complete understanding of the present invention.

At the forward end of harvesting portion 12 are a plurality of rotatable harvesting blades 24. Harvesting blades 24 engage the ground and dig up the grass sprigs and throw the grass sprigs and attached soil onto the top of a forward portion 26 of a main or first elevator chain 28.

Elevator chain 28 is mounted on a plurality of guide and support rollers, such as rollers 30, 32, 34 and 36. Additional rollers and other guide support means may be used as necessary or desired. Harvesting blades 24 and at least some of the rollers are hydraulically driven by a system which includes a hydraulic motor 42. Hydraulic motor 42 may be actuated by a power takeoff (not shown) or other device on the vehicle (not shown) pulling harvesting apparatus 10. The interconnecting piping, connections and valves of the hydraulic system are omitted for clarity. In the illustrated embodiment, roller 36 is a powered roller driven through a belt drive system 44.

A forward shroud 46 contains the grass sprigs and soil as they are thrown onto main elevator chain 28.

As best seen in FIG. 2, chain 28 includes a plurality of elongated, transversely disposed links 48. Links 48 have a plurality of gaps 50 therebetween. As the grass sprigs and soil attached thereto are moved upwardly on the top of chain 28 toward upper end 52 thereof, the vibration of the chain is sufficient to break most or all of the soil away from the grass sprigs and so that the soil falls through gaps 50 to the ground. Thus, substantially only the grass sprigs themselves reach upper end 52 of chain 28.

Upper end 52 of chain 28 is enclosed in an upper shroud 54 which has a downwardly facing upper end 56. As the grass sprigs reach upper end 52, it will be seen that they are then free to fall off chain 52 downwardly through open end 56 of upper shroud 54. As will be further discussed herein, the grass sprigs are thus directed to, and free to fall into, hopper/elevator portion 14 when the hopper/elevator portion is in the operating position shown in FIGS. 3, 4 and 6. A flexible flap 57 fills the gap between upper shroud 54 and the top of hopper/elevator portion 14 to contain the grass sprigs and prevent them from falling outside apparatus 10.

A vertical member 58 provides support to upper shroud 54 and thus to the upper and rearward area of harvesting portion 12 on chassis 16.

Figure 3:
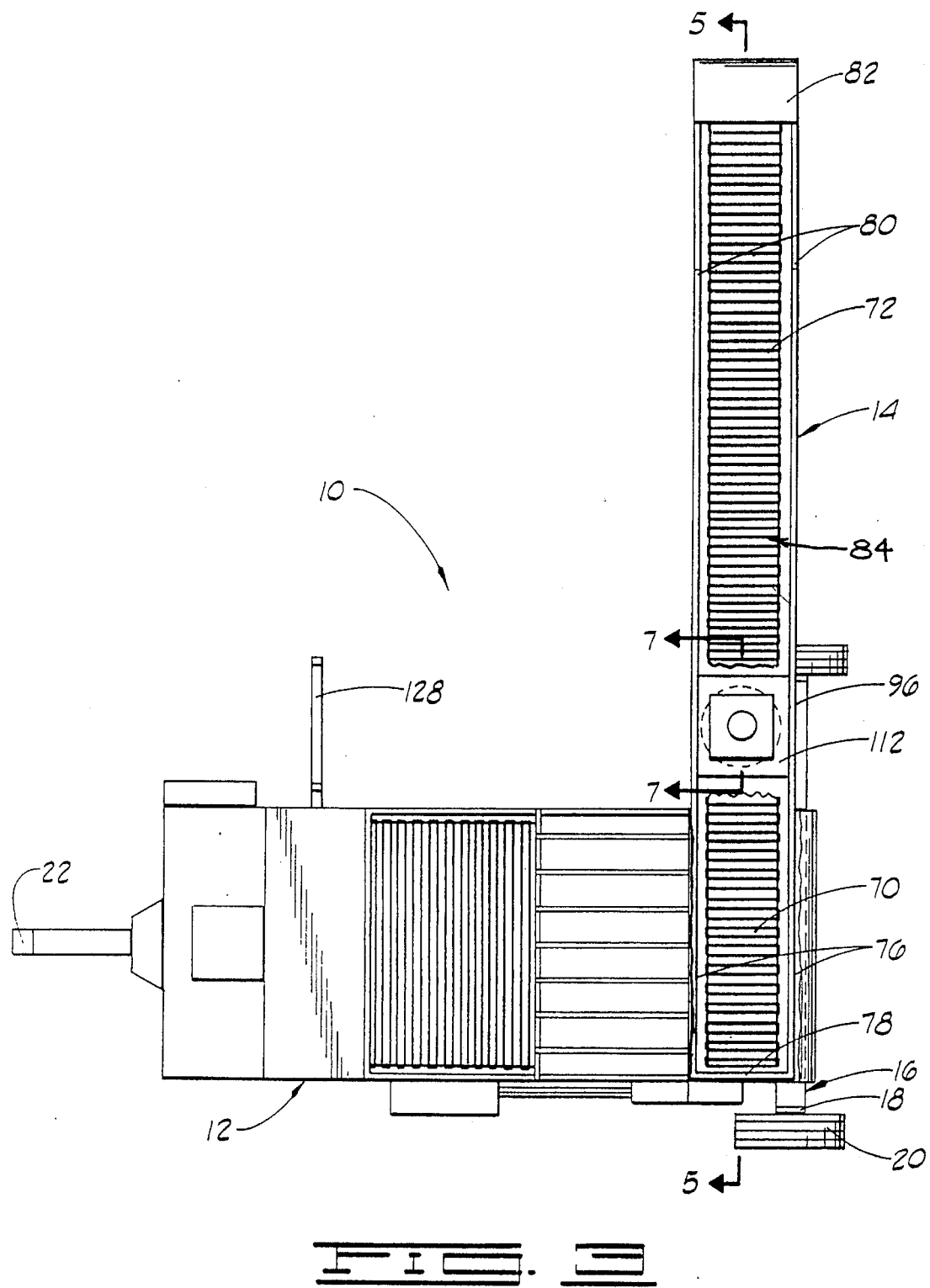
FIG. 3 presents a plan view of the sprig harvester apparatus in the operating position.

Referring now to FIGS. 1, 3 and 4, the details of hopper/elevator portion 14 will be discussed. Hopper/elevator portion 14 includes a hopper section 70 and an upper elevator section 72. As best seen in FIG. 4, elevator section 72 is movably connected to hopper section 70 by a pivot 74.

Hopper section 70 has a pair of vertically disposed side walls 76 connected at one end by an end wall 78. The other end of hopper section 70 opens into elevator section 72.

Elevator section 72 has a pair of vertical side walls 80 and is closed at its distal end by an end shroud 82.

Hopper section 70 and elevator section 72 are open on their upper sides and substantially open on their lower sides. Referring also to FIG. 5, an upper or second elevator chain 84 is disposed in both hopper section 70 and upper elevator section 72 of hopper/elevator portion 14. Elevator chain 84 is an endless chain of a kind known in the art having a plurality of elongated, spaced links 85 and is supported on its upper side by a plurality of support and guide rollers 86 in hopper section 70 and similar rollers 88 in upper elevator section 72. Chain 84 is further supported on its lower side by a plurality of rollers 90 in hopper section 70 and rollers 92 in upper elevator section 72. Chain 84 is driven by a drive roller 94 disposed in the upper end of upper elevator section 72. Drive roller 94 is preferably hydraulically driven in a manner known in the art.

Figure 7:
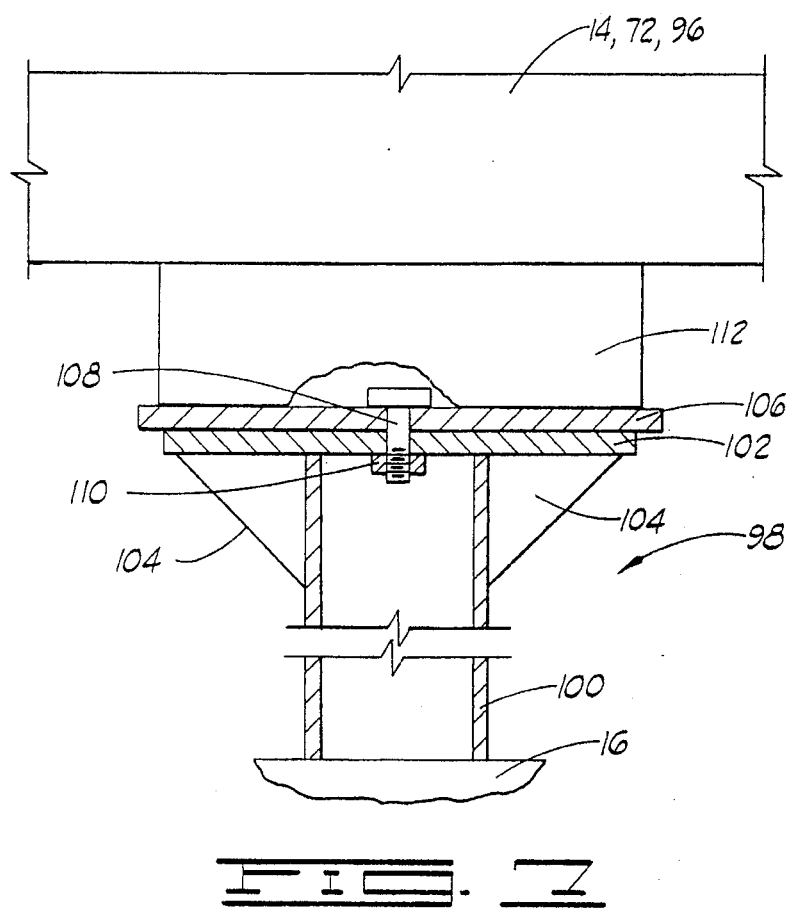
FIG. 7 is a detailed cross-sectional view of the pivot taken along lines 7—7 of FIG. 3.

An end 96 of hopper section 70 opposite end wall 78 is mounted on a pivot assembly 98 attached to chassis 16. Referring now to FIG. 7, pivot assembly 98 includes a support pipe or post 100 which is attached at its lower end to chassis 16 in a manner known in the art, such as by welding. A lower pivot plate 102 is attached to the upper end of support pipe 100, again by a means known in the art, such as welding. A plurality of webs 104 interconnect support pipe 100 and lower pivot plate 102 to add additional strength. An upper pivot plate 106 is disposed on lower pivot plate 102. Upper pivot plate 106 and lower pivot plate 102 are pivotally interconnected by fastening means, such as a centrally located bolt 108 engaged by a nut 110. The engagement of nut 110 with bolt 108 is such that it allows rotation of upper pivot plate 106 with respect to stationary lower pivot plate 102. Any lubricant known in the art may be disposed between upper pivot plate 106 and lower pivot plate 102 to facilitate rotation, but the invention is not intended to be so limited.

A generally square pivot frame 112 is fixedly attached to the top of upper pivot plate 106, such as by welding, and end 96 of hopper section 70 is similarly attached to the top of pivot frame 112. Thus, it will be seen by those skilled in the art that a means is provided for pivoting hopper section 70, and thus the entire hopper/elevator portion 14, with respect to chassis 16 and harvesting portion 12. Pivotation is about the substantially vertical axis of pivot assembly 98.

Referring again to FIG. 4, a cylinder support 120 extends upwardly from hopper section 70. Cylinder support 120 may be strengthened by a brace 122. Another cylinder support 124 extends upwardly from upper elevator section 72. A hydraulic cylinder 126 interconnects the upper ends of cylinder supports 120 and 124. Hydraulic cylinder 126 is connected to a hydraulic power source (not shown) of a kind known in the art, such as a hydraulic supply on the vehicle pulling apparatus 10. One such vehicle is a tractor. The interconnecting tubes and valves are omitted for clarity.

By retracting hydraulic cylinder 126, upper elevator section 72 is pivoted upwardly about the substantially horizontal axis of pivot 74 with respect to hopper section 70, as shown by the phantom lines in FIG. 4. By extending hydraulic cylinder 126, upper elevator section 72 is lowered by pivotation about pivot 74. This hydraulic cylinder arrangement greatly eases and simplifies the raising and lowering of upper elevator section 72 when compared to the manual system of the prior art.

Thus, hopper/elevator portion 14 may be pivoted about a vertical axis between the traveling position shown in FIGS. 1 and 2 and the operating position shown in FIGS. 3, 4 and 6. When hopper/elevator portion 14 is pivoted to the traveling position, upper elevator section 72 is disposed over a support arm 128. By actuating hydraulic cylinder 126, upper elevator section 72 may be lowered to rest on support arm 128. This prevents undesired vertical movement of upper elevator section 72 as apparatus 10 is pulled down the road.

When hopper/elevator portion 14 is in the operating position in which hopper section 70 and upper elevator section 72 extend transversely with respect to chassis 16, the distal end of hopper section 70 which includes end wall 78 is supported on a hopper support 130 as best seen in FIGS. 4 and 6.

Operation Of The Invention

Sprig harvester apparatus 10 of the present invention is transported in the traveling position shown in FIGS. 1 and 2 in which hopper/elevator portion 14 is disposed longitudinally with respect to chassis 16 and is thus substantially parallel to harvesting portion 12. As previously described, upper elevator section 72 is lowered to rest upon support arm 128.

When apparatus 10 is at the desired harvesting location, its hydraulic system is connected to a hydraulic source which powers the various components previously described, including hydraulic cylinder 126. Hydraulic cylinder 126 is retracted slightly to raise upper elevator section 72 above support arm 128. Hopper/elevator portion 14 may then be rotated clockwise on pivot assembly 98 as seen in FIG. 1 until the hopper/elevator portion is in the transversely disposed operating position shown in FIGS. 3, 4 and 6.

In this position, harvesting portion 12 is operated in the manner previously described in which harvesting blades 24 cut the grass sprigs and convey them onto main elevator chain 28 where they are moved upwardly and discharged through open lower end 56 of upper shroud 54. The grass sprigs then fall onto the horizontal portion of upper elevator chain 84 in hopper section 70 of hopper/elevator portion 14.

Upper elevator chain 84 conveys the grass sprigs upwardly through upper elevator section 72 with the grass sprigs eventually being dropped off chain 84 such that they fall out open lower end 132 of end shroud 82 and downwardly into a waiting transport vehicle, such as truck 134. Hydraulic cylinder 126 is used to position upper elevator section 72 as desired with respect to truck 134. The grass sprigs may then be transported to any desired location for replanting.

When harvesting is complete, hopper/elevator portion 14 is again moved back to the longitudinally disposed traveling position so that apparatus 10 may be moved to another harvesting location as desired.

It will be seen, therefore, that the sprig harvester apparatus of the present invention is well adapted to carry out the ends and advantages mentioned as well as those inherent therein. While a presently preferred embodiment of the apparatus has been shown for the purposes of this disclosure, numerous changes in the arrangement and construction of parts may be made by those skilled in the art. All such changes are encompassed within the scope and spirit of the appended claims.

What is claimed is:

1. A sprig harvester apparatus comprising:
    a harvesting portion comprising means for removing grass sprigs from a ground surface;
    an elevator portion adjacent to said harvesting portion and adapted for receiving grass sprigs discharged from said harvesting portion; and
    means for pivoting said elevator portion with respect to said harvesting portion, wherein said means for pivoting is characterized by a pivot assembly comprising:
        a stationary lower pivot plate;
        an upper pivot plate disposed on said lower pivot plate and rotatable with respect thereto; and
        a pivot frame attached to said elevator portion and said upper pivot plate.

2. The apparatus of claim 1 wherein said elevator portion may be pivoted between a traveling position substantially parallel to said harvesting portion and an operating position substantially perpendicular to said harvesting portion.

3. The apparatus of claim 1 wherein said elevator portion comprises:
    a hopper section attached to said means for pivoting; and
    an upper elevator section pivotally connected to said hopper section.

4. The apparatus of claim 1 wherein said means for pivoting has a substantially vertical axis.

5. A sprig harvester apparatus comprising:
    a chassis;
    a harvesting portion mounted on said chassis, said harvesting portion comprising:
        a plurality of rotatable harvesting blades adapted for engaging a ground surface and removing grass sprigs therefrom;
        a movable first elevator chain having a portion adjacent to said harvesting blades and adapted for receiving said grass sprigs from said blades, and further having an upper end; and
        an upper shroud disposed adjacent to said upper end of said first elevator chain through which said grass sprigs are discharged from said harvesting portion;
    a pivot assembly attached to said chassis and comprising:
        a support post attached to said chassis;
        a lower pivot plate attached to an upper end of said post; and
        an upper pivot plate pivotally disposed on said lower pivot plate; and
        a hopper/elevator portion attached to said pivot assembly such that said hopper/elevator portion may be pivoted between a traveling position and an operating position, said hopper/elevator portion being adapted for receiving grass sprigs discharged from said harvesting portion and comprising a movable second elevator chain adapted for moving said grass sprigs toward a receptacle.

6. The apparatus of claim 5 wherein said pivot assembly further comprises a pivot frame attached to said upper pivot plate and said hopper/elevator portion.

7. The apparatus of claim 5 further comprising fastening means for pivotally fastening said upper pivot plate to said lower pivot plate.

8. The apparatus of claim 5 further comprising a web for reinforcing said lower pivot plate on said pipe.

9. The apparatus of claim 5 wherein said pivot assembly has a substantially vertical axis.

10. The apparatus of claim 5 wherein:

said hopper/elevator portion is disposed longitudinally when in said traveling position; and said hopper/elevator portion is disposed transversely when in said operating position.

11. A sprig harvester apparatus comprising:

a harvesting portion comprising means for removing grass sprigs from a ground surface;

an elevator portion adjacent to said harvesting portion and adapted for receiving grass sprigs discharged from said harvesting portion, wherein said elevator portion comprises:

a hopper section; and an upper elevator section pivotally connected to said hopper section;

means for pivoting said elevator portion with respect to said harvesting portion, said hopper section being attached to said means for pivoting; and a hydraulic cylinder interconnecting said hopper section and said elevator section such that said elevator section may be raised and lower with respect to said hopper section.

12. The apparatus of claim 11 wherein retracting said hydraulic cylinder raises said elevator section, and extending said hydraulic cylinder lowers said elevator section.

13. A sprig harvester apparatus comprising:

a chassis;

a harvesting portion mounted on said chassis, said harvesting portion comprising:

a plurality of rotatable harvesting blades adapted for engaging a ground surface and removing grass sprigs therefrom;

a movable first elevator chain having a portion adjacent to said harvesting blades and adapted for receiving said grass sprigs from said blades, and further having an upper end; and an upper shroud disposed adjacent to said upper end of said first elevator chain through which said grass sprigs are discharged from said harvesting portion;

a pivot assembly attached to said chassis; and a hopper/elevator portion attached to said pivot assembly such that said hopper/elevator portion may be pivoted between a traveling position and an operating position, said hopper/elevator portion being adapted for receiving grass sprigs discharged from said harvesting portion and comprising a movable second elevator chain adapted for moving said grass sprigs toward a receptacle, said hopper/elevator portion comprising:

a hopper section connected to said pivot assembly and adapted for receiving grass sprigs discharged from said harvesting portion; and an upper elevator section pivotally connected to said hopper section such that said upper elevator section may be raised and lowered with respect to said hopper section;

wherein, said upper elevator chain is disposed in both of said hopper and said upper elevator sections.

14. The apparatus of claim 13 wherein said upper elevator section is pivotable about a substantially horizontal axis.

15. The apparatus of claim 13 further comprising:

a cylinder support attached to said hopper section;

another cylinder support attached to said upper elevator section; and a hydraulic cylinder interconnecting said cylinder supports.

16. The apparatus of claim 15 wherein:

retracting of said hydraulic cylinder raises said upper elevator section with respect to said hopper section; and extending said hydraulic cylinder lowers said upper elevator section with respect to said hopper section.

17. The apparatus of claim 13 further comprising a hopper support for supporting said hopper section when said hopper/elevator portion is in said operating position.

18. The apparatus of claim 17 wherein:

said hopper section is attached at one end thereof to said pivot assembly; and said hopper support is disposed below an opposite end of said hopper section when said hopper/elevator portion is in said operating position.

* * * * *

UNITED STATES PATENT AND TRADEMARK OFFICE
CERTIFICATE OF CORRECTION

PATENT NO. : 5,528,890
DATED : June 25, 1996
INVENTOR(S) : Jimmy D. Gray and Louis F. Klingsick, Jr.

It is certified that error appears in the above-identified patent and that said Letters Patent is hereby corrected as shown below:

Column 7, line 29 (Claim 11) delete "lower" and insert -- lowered-- therefor.

Signed and Sealed this

Tenth Day of September, 1996

Attest:

BRUCE LEHMAN

Attesting Officer        Commissioner of Patents and Trademarks